(12) United States Patent
Carroll

(10) Patent No.: US 8,332,644 B2
(45) Date of Patent: *Dec. 11, 2012

(54) CRYPTOGRAPHIC TECHNIQUES FOR A COMMUNICATIONS NETWORK

(75) Inventor: Christopher P. Carroll, Nutick, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,253

(22) Filed: Oct. 20, 2009

(65) Prior Publication Data

US 2010/0040230 A1 Feb. 18, 2010

Related U.S. Application Data

(63) Continuation of application No. 11/469,977, filed on Sep. 5, 2006, now Pat. No. 7,613,299, which is a continuation of application No. 09/710,541, filed on Nov. 9, 2000, now Pat. No. 7,131,006.

(60) Provisional application No. 60/165,539, filed on Nov. 15, 1999, provisional application No. 60/167,811, filed on Nov. 29, 1999.

(51) Int. Cl.
*H04L 29/06* (2006.01)

(52) U.S. Cl. .................................... 713/171; 455/435.1

(58) Field of Classification Search .......... 713/168–171; 726/2–7; 380/247–250, 260–262; 455/410, 455/411, 432.1
See application file for complete search history.

(56) References Cited

U.S. PATENT DOCUMENTS

| | | | |
|---|---|---|---|
| 4,888,800 A | 12/1989 | Marshall et al. | |
| 4,941,176 A | 7/1990 | Matyas et al. | |
| 4,993,069 A | 2/1991 | Matyas et al. | |
| 5,091,942 A * | 2/1992 | Dent | 380/46 |
| 5,239,294 A | 8/1993 | Flanders et al. | |
| 5,241,598 A * | 8/1993 | Raith | 380/248 |
| 5,243,653 A * | 9/1993 | Malek et al. | 380/272 |
| 5,506,905 A | 4/1996 | Markowski et al. | |
| 5,604,802 A | 2/1997 | Holloway | |
| 5,915,021 A | 6/1999 | Herlin et al. | |
| 5,940,512 A * | 8/1999 | Tomoike | 380/248 |
| 5,991,407 A | 11/1999 | Murto | |
| 6,026,165 A * | 2/2000 | Marino et al. | 380/273 |
| 6,144,848 A * | 11/2000 | Walsh et al. | 455/419 |
| 6,240,514 B1 | 5/2001 | Inoue et al. | |
| 6,243,811 B1 | 6/2001 | Patel | |
| 6,463,055 B1 | 10/2002 | Lupien et al. | |
| 6,477,644 B1 * | 11/2002 | Turunen | 713/161 |
| 6,574,730 B1 | 6/2003 | Bissell et al. | |
| 6,600,917 B1 | 7/2003 | Maupin | |
| 6,711,400 B1 * | 3/2004 | Aura | 455/411 |
| 2003/0033522 A1 | 2/2003 | Bilgic et al. | |

OTHER PUBLICATIONS

3rd Generation Partnership Project, Technical Specification Group Services and Systems Aspects; 3G Security; Security Architecture (3G TS 33.102 Version 3 .1. 0) Jul. 1999 downloaded from www.3gpp.org. Proposal for an Authentication and Key Agreement Mechanism (AKA) for TIA TR45 ESA using the 3GPP AKA mechanism source; Vodafone-Airtouch, Jul. 1999.
TR45.AHAG Common Cryptographic Algorithms, Revision D.1 Draft Sep. 12, 2000, Telecommunications Industry Association.
TR45.AHAG Interface Specification for Common Cryptographic Algorithms, Revision D.1 Draft Sep. 12, 2000 Telecommunications Industry Association.

* cited by examiner

*Primary Examiner* — Gilberto Barron, Jr.
*Assistant Examiner* — Abdulhakim Nobahar

(57) ABSTRACT

Techniques are described for enabling authentication and/or key agreement between communications network stations and service networks. The techniques described include the negotiation and use of a cryptographic primitive shared between a service network and a home environment of a station. The techniques described also feature a key usage indicator, such as a sequence number, maintained by the service network and a station. Comparison of the key usage indicators can, for example, permit efficient authentication of the service network.

5 Claims, 15 Drawing Sheets

US 8,332,644 B2

CRYPTOGRAPHIC TECHNIQUES FOR A COMMUNICATIONS NETWORK

CROSS-REFERENCE TO RELATED APPLICATIONS

This application claims the benefit of U.S. application Ser. No. 11/469,977 filed Sep. 5, 2006, which claims the benefit of 09/710,541 filed Nov. 9, 2000, now U.S. Pat. No. 7,131,006, which claims the benefit of 60/165,539 filed Nov. 15, 1999, which claims the benefit of 60/167,811 filed Nov. 29, 1999, the disclosures of which are expressly incorporated herein by reference in their entirety.

RELATED U.S. APPLICATIONS

This application claims priority from parent application Ser. No. 09/710,541 filed on Nov. 9, 2000, entitled "CRYPTOGRAPHIC TECHNIQUES FOR A COMMUNICATIONS NETWORK" and having the same inventive entity as that in the instant continuing application, said parent application, in turn, claiming priority from U.S. Provisional Patent Application Ser. No. 60/165,539, entitled "THIRD GENERATION WIRELESS COMMUNICATIONS AUTHENTICATION AND KEY AGREEMENT MECHANISM OPTION", filed Nov. 15, 1999; and U.S. Provisional Patent Application Ser. No. 60/167,811, entitled "THIRD GENERATION WIRELESS COMMUNICATIONS AUTHENTICATION AND KEY AGREEMENT MECHANISM OPTION", filed Nov. 29, 1999. Both provisional applications as well as said parent application are incorporated by reference herein in their entirety. Benefits of the earlier filing date of said parent application are claimed under 35 U.S.C. §120.

BACKGROUND OF THE INVENTION

1. Field of the Invention

The present invention relates generally to cryptographic techniques for use in a communications network such as a wireless communications network.

2. Description of Related Art

First generation wireless communications networks were based on analog technologies such as the Advanced Mobile Phone Service (AMPS). Second generation wireless communications networks introduced digital communications technologies such as the Global System Mobile (GSM), IS-136 Time Division Multiple Access (TDMA), and IS-95 Code Division Multiple Access (CDMA). Authentication and Key Agreement (AKA) protocols were developed for first and second generation networks to prevent theft of cellular telephone service, to provide subscriber voice privacy, and to provide other security features.

FIG. 1 illustrates a typical cellular telephone or Personal Communication Services (PCS) network. A subscriber, using a Mobile Station (MS) 130 (e.g., a cellular phone), can roam outside of the area covered by their Home Environment (HE) 110 network and obtain wireless communications service from a Serving Network (SN) 120. The HE 110 and SN 120 networks typically include a switch, base station, and other components (not shown), as is known in the art. As is known in the art, the HE 110, SN 120, and MS 130 are controlled by software, firmware, and/or hardware instructions.

The MS 130 often features a removable Universal Subscriber Identity Module (USIM) that resides in the MS 130 to store subscriber Information such as a subscriber's identity, secret key information, and so forth. To simplify descriptions herein, the USIM is considered part of MS 130. However, a subscriber can transfer their USIM into other MS-s 130 to obtain service.

An AKA protocol for second generation wireless communication networks provides MS 130 to SN 120 authentication. In a typical GSM system, the HE 110 and MS 130 share a common 128-bit secret key K. To enable roaming privacy and authentication, HE 110 passes an authentication vector including three pieces of cryptographic data to a SN 120. Each vector includes a random challenge, response, and privacy key.

When MS 130 requests service, SN 120 transmits the random challenge over the air to the MS 130. MS 130 combines the random challenge with the secret key K using a cryptographic primitive (e.g., a hash function) to generate the response. MS 130 transmits the response to SN 120 which compares the response value received from MS 130 with the response value provided by HE 110. If the response values are equal, SN 120 provides system access to MS 130. MS 130 also uses the random challenge and K to create a privacy key that is identical to the privacy key sent from HE 110 to SN 120 as part of the cryptographic triplet. With the same privacy key, SN 120 and MS 130 can securely communicate. In this scheme, the SN 120 need not implement a cryptographic primitive (e.g., a hash function).

A third generation AKA mechanism adopted by the Third Generation Project Partners (3GPP) enhances the original GSM AKA mechanism by enabling mutual authentication between SN 120 and MS 130. The 3GPP AKA mechanism replaces the GSM crypto-triplet vector with a crypto quintet authentication vector (AV) to facilitate MS/SN mutual authentication.

FIG. 2 illustrates formation of an AV by an HE 110. As shown, the AV includes five components concatenated together: (1) the random challenge (RAND), (2) an expected response (XRES), (3) a cipher key (CK), (4) an integrity key (IK), and (5) an authentication token (AUTN). AUTN includes three components: (1) an exclusive- or of a sequence number (SON) and anonymity key (AK), (2) a MODE value, and (3) a message authentication code (MAC). The sequence number indicates the AVs position in a sequence of AVS. Functions f1 through f5 are derived using a cryptographic primitive shared between HE 110 and MS 130. Different values of primitive constants or parameters control which function, f1 through f5, the primitive provides.

When roaming, a MS 130 may be authenticated each time a MS 130 owner places a call. Thus, typically, an HE 110 sends multiple AVs to SN 120 to enable multiple authentications between SN 120 and MS 130.

FIG. 3 illustrates SN 120 authentication in 3GPP AKA. To authenticate SN 120, the MS 130 and HE 110 keep track of counters $SQN_{MS}$ and $SQN_{HE}$. When HE 110 generates an AV, $SQN_{HE}$ is incremented. MS 130 authentication of SN 120 is performed by ensuring that SQN in each new AV is greater than SON in the previous AV. The MS 130 also verifies that $SQN_{HE}$ originated from the HE 110 by verifying the MAC in the AUTN.

It is possible for the SQN counter in HE 110 and MS 120 to lose synchronization. For this reason, the 3GPP AKA mechanism has SON re-synchronization procedures. If K is reset or replaced for a particular USIM, SQN can be reset at the HE 110 and MS 130.

FIG. 4 illustrates the flow of a typical 3GPP AKA mechanism, When MS 130 requests service from SN 120, SN 120 sends (step 202) an authentication request to HE 130. Upon receiving the request associated with a particular MS 130, HE 110 generates (step 204) an array of AVs for that particular MS 130. HE 110 sends (step 206) the AVs to SN 120 which, in turn, stores (step 208) the AVs in its Visitor Location Register (VLR). SN 120 selects (step 210) the first sequential AV(i) (e.g., i=1) and sends (step 212) RAND(i) and AUTN(i) to MS 130. MS 130 verifies (step 214) AUTN(i) and computes RES(i). If SQN(i) is greater than $SQN_{MS}$, MS 130 successfully authenticates SN 120. MS 130 sends (step 216) RES(i) to SN 120. SN 120 compares (step 218) RES(i) with XRES(i). If RES and XRES are equal, SN 120 has successfully authenticated MS 130. Finally, MS 130 computes (step 220) CK(i) and IK(i) while SN 120 selects CK(i) and IK(i).

FIG. 5 illustrates a cryptographic key hierarchy of the 3GPP AKA mechanism. A secret key K is the root secret shared only between the HE 110 and MS 130. Whenever mutual authentication is performed, a cipher key (CK) is generated to facilitate voice and data privacy.

Additionally, an integrity key (IK) is generated to facilitate message authentication.

The North American Telecommunications industry Association (TIA) TR-45 standards group has based AKA on a shared secret between HE 110, SN 120, and MS 130. In a TR-45 cellular/PCS network, HE 110 sends Shared Secret Data (SSD) to SN 120 to enable MS 130 to SN 120 authentication. SSD is derived from an Authentication key (A-key), shared between HE 110 and MS 130 only. The A-key is analogous to the GSM secret key K. SSD consists of SSD-A, used for MS 130 challenges response authentication, and SSD-B, used for SN/MS voice and data privacy. When MS 130 requests service from SN 120, HE 110 sends SSD to SN 120. With SSD, SN 120 can authenticate MS 130 until SSD is updated between HE 110 and MS 130.

Unlike a GSM network where SN 120 continuously requests new vectors of crypto-triplets to perform MS 130 authentication, SN 120 in a TR-45 network acquires unique SSD from HE 110 and uses SSD for the duration that MS 130 operates within the SN 120 area. Ideally, SSD update is performed between HE 110 and MS 130 after MS 130 leaves the SN 120 area to establish a new SSD, preventing SN 120 from knowing an SSD used by another service network. Unfortunately, many service providers do not update SSD frequently, allowing many service providers to know SSD-A which is the authentication secret for TR-45 cellular telephones.

The TIA TR-45 is considering adoption of the 3GPP AKA for TR-45 networks to support global harmonization of wireless communication standards. To retain the advantages of using a shared secret like SSD, the TR-45 is considering using the 3GPP IK key as SSD for third generation TR-45 wireless networks.

Additionally, the TR-45 is considering the adoption of the Long-term Enhanced Subscriber Authentication (LESA) AKA in which interlocking challenges provide mutual authentication between SN 120 and MS 130. In the LESA AKA mechanism, SN 120 sends a random number $R_N$ to MS 130. MS 130 generates a second random number $R_M$. MS 130 computes a response to SN 120 by combining $R_N$, $R_M$, and SSD in a cryptographic primitive. MS 130 sends the response and random number $R_N$, to SN 120. With $R_M$, SN 120 computes the same response, authenticating MS 130. Then SN 120 computes a second response for MS 130 by combining $R_M$ and SSD in the cryptographic primitive. SN 120 sends the second response to MS 130. MS 130 verifies the second response, authenticating SN 120.

Finally, 3GPP has considered an AKA mechanism similar to the LESA AKA, known as Authentication based on a Temporary Key (A-TK). The A-TK AKA mechanism uses a procedure of interlocking challenges between HE 110 and MS 130 to establish a temporary key (KT). Once KT is established, SN 120 uses traditional challenge-response to authenticate MS 130. MS 130 authentication of SN 120, however, is not performed explicitly, but is implicitly achieved by the establishment of CK and IK based on random numbers provided by SN 120 and MS 130.

SUMMARY OF THE INVENTION

Techniques are described for enabling authentication, key agreement, and/or encrypted communication between communications network stations and service networks. The techniques described herein can include the negotiation and use of a cryptographic primitive shared between a service network and a home environment of a station. The techniques described also include use of a key usage indicator, such as a sequence number, maintained by the service network and a station. Comparison of the key usage indicators can, for example, permit efficient authentication of the service network by the station without undue burden on a home environment network of the station.

In general, in one aspect, the invention features a method for use in authenticating a service network to a station. The method includes storing a key at the service network and transmitting information to the station that enables the station to compute the key stored at the service network. The method also includes receiving a request for service at the service network from the station, adjusting a value corresponding to key usage, and transmitting information corresponding to the value to the station.

Embodiments may include one or more of the following features. The method may include receiving a vector of authentication information from the home environment network of the mobile station. The vector includes an indication of the vector's position in a sequence of vectors. The information transmitted to the station that enables the station to compute the key stored at the service network may include one or more portions of the received vector of authentication information. The received vector of authentication information can include the key stored by the service network. The method may further include computing, at the service network, the key stored by the service network based on information included in the received vector.

Adjusting a value indicating use of the key can include incrementing a sequence number corresponding to a number of times the key has been used. The method may further include using the key to compute a cipher key for encrypting communication between the service network and the station. The method may also include negotiating use of a cryptographic primitive between the service network and the home environment network.

In general, in another aspect, the invention features a method for use in authenticating a service network to a station. The method includes computing a key, stored by the service network, based on information received at the station from the service network. The station maintains an indicator of key usage. The method includes receiving at the station an indicator of key usage maintained by the service network and comparing the key usage indicator maintained by the service network with the key usage indicator maintained by the station.

Embodiments may include one or more of the following features. The method may further include maintaining an authentication vector sequence number at the station, receiving at the station from the service network an indication of an authentication vector sequence number maintained by the home environment network, and comparing the authentication vector sequence number maintained by the home environment network with the received authentication vector sequence number maintained by the station. The method may include receiving from the service network identification of a cryptographic primitive. The method may include using the key to compute a cipher key for encrypting communication between the service network and the station.

In general, in another aspect, the invention features a method for use in authentication in a communications network including a home environment network, a service network, and a station. The method includes determining at the home environment network a cryptographic primitive offered by the service network and transmitting to the service network at least one vector of authentication information corresponding to a particular station.

Embodiments may include one or more of the following features. Determining may include receiving identification of the cryptographic primitive from the service network, for example, as a value of a MODE field. The vector of authentication information may include an indication of an authentication vector sequence number maintained by the home environment network.

In general, in another aspect, the invention features a method for use by a mobile station that can communicate with different service networks. The method includes storing different sets of cryptographic information for the different respective service networks, selecting a set of cryptographic information for one of the service networks, and using the selected set of cryptographic information to communicate with the service network.

Embodiments may include one or more of the following. The sets of cryptographic information may include a key shared by the station and the service network. The method may include computing the key shared by the station and the service network based on information received from the service network. The sets of cryptographic information may include an indicator of usage of the key. Using the selected set of cryptographic information may include using the selected set of cryptographic information in encrypting communication between the station and the service network.

In general, in another aspect, the invention features a method of handling authentication and key agreement in a system including a home environment network, a service network, and a mobile station in which the home environment network and the mobile station share a secret key K. The method includes determining whether the home environment and the service network share a cryptographic primitive. If it is determined that the home environment and the service network do not share a cryptographic primitive, the method handles authentication and key agreement between the mobile station and the service network using 3GPP (Third Generation Project Partners) AKA (authentication and key agreement). If it is determined that the home environment and the service network share a cryptographic primitive, handling authentication and key agreement by computing a shared secret key (SSK), transmitting information from the service network to the station that enables the station to compute the SSK, and
replacing the use of K in the 3GPP AKA with SSK.

Advantages will become apparent in view of the following description, including the figures and the claims.

DETAILED DESCRIPTION OF THE PREFERRED EMBODIMENTS

Described herein are techniques that can securely, efficiently, and robustly handle authentication and key agreement in a communications network such as a wireless communications network. In particular, the techniques described herein can enhance traditional 3GPP AKA by giving service providers the option to use traditional 3GPP AKA or an optional AKA mechanism. The present invention is not limited to wireless applications, and can also be used in other networks such as electronic toll systems, internet access terminals, cable TV and data networks, and other networks in which a service provider allows subscribers to use another service provider's network. For purposes of the following description, the techniques are described with respect to a wireless communications network. However, the description should be understood as applying to other networks or devices, such as the ones discussed above.

In one aspect, the invention features an optional 3GPF AKA mechanism that can be used in conjunction with the traditional 3GPP AKA. In the optional 3GPP AKA, a HE 110 and SN 120 share at least one common cryptographic primitives For example, HE 110 and SN 120 may both use SA-1 or MD-5 as a cryptographic hash function.

The optional 3GPP AKA can include procedures that allow for primitive negotiation, for example, between the HE 110 and SN 120. For example, a one byte MODE field can store data identifying the AKA cryptographic primitive or set of AKA cryptographic primitives offered by an HE 110, SN 120, or MS 120. For example, a MODE field value of "S" can represent a request for communication using a shared SHA-1 primitive. The SN 120 authentication data requests can also include a primitive version identifier.

As will be appreciated by those of skill in the art, a field other than the MODE field may be used to facilitate AMA primitive negotiation between elements of the communication network. Additionally, as those of skill in the art will appreciate, a wide variety of alternate information exchanges can be used to negotiate a shared primitive. For example, either the HE 110 or SN 120 may initiate negotiation. Similarly, either the HE 110 or SN 120 may initially identify the cryptographic primitives) it offers.

If HE 110 and SN 120 do not share a common AKA primitive (e.g., if HE 110 determines that it does not provide the primitive identified in an SN 120 request for AVs), standard 3GPP AKA is performed instead of the optional 3GPP ALA mechanism described below. If HE 110 and SN 120 share a common AKA primitive, the optional 3GPP AKA mechanism, may be used to increase the efficiency of mutual authentication between the MS 130 and SN 120.

Figure 6:
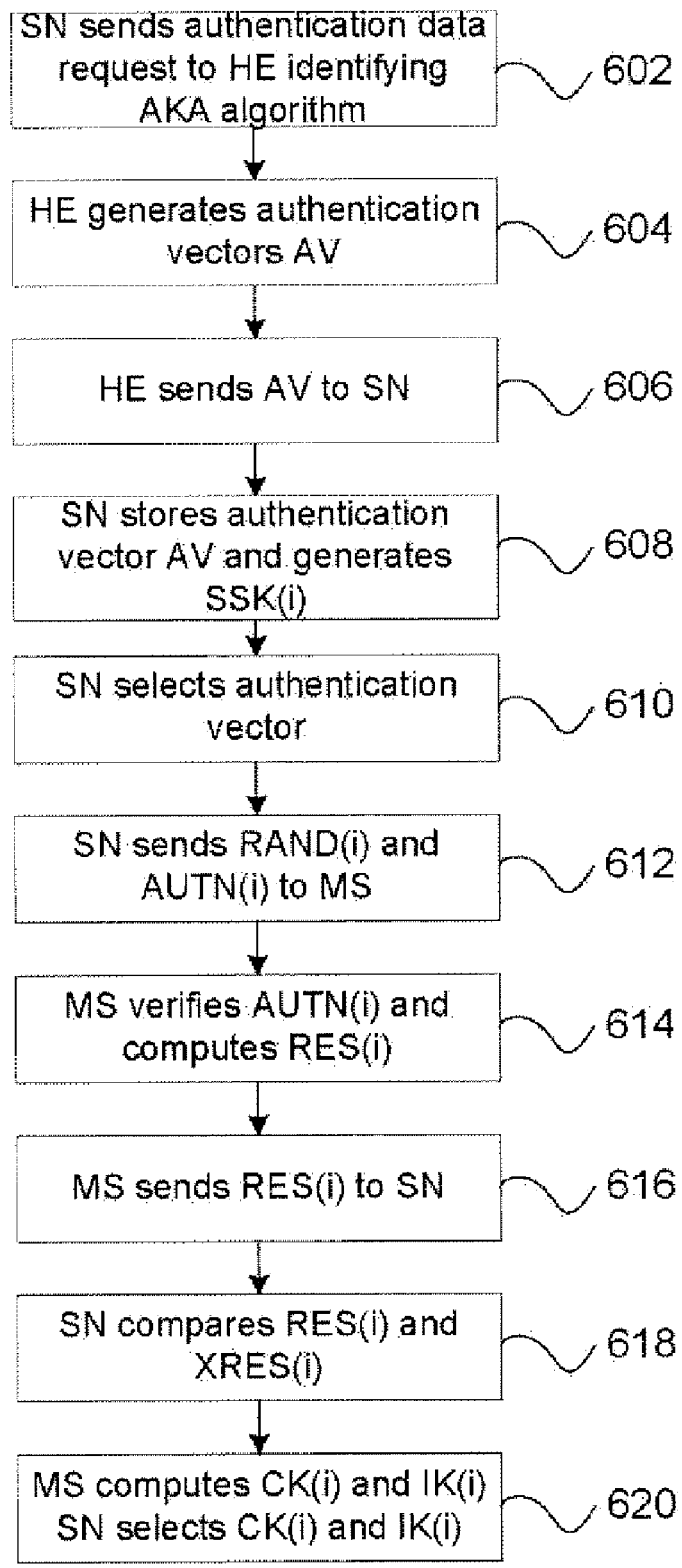
FIG. 6 is a flowchart of an initial authentication and key agreement process used to generate a shared secret K.

FIG. 6 illustrates the flow of an optional AKA mechanism that can reduce the amount of Authentication vector (AV) traffic by establishing a Shared Secret K (SSK) between the MS 130 and SN 120 using one AV. As shown, when MS 130 requests service from SN 120, SN 120 sends (step 602) an authentication request to HE 130 indicating that a common primitive is available. Upon receiving the request associated with a particular MS 130 and noting the indication of a shared primitive (e.g., HE 110 offers the same primitive as indicated by the MODE field), HE 110 generates (step 604) at least one AV associated with that particular MS 130. After generating (step 604) the AV, the HE 110 sends (step 606) the AV to SN 120. SN 120 stores the AV in its Visitor Location Register (VLR) and generates (step 608) SSK(i). After initial communication, communication between the SN 120 and MS 130 will depend on both computing the same SSK(i).

Figure 1:
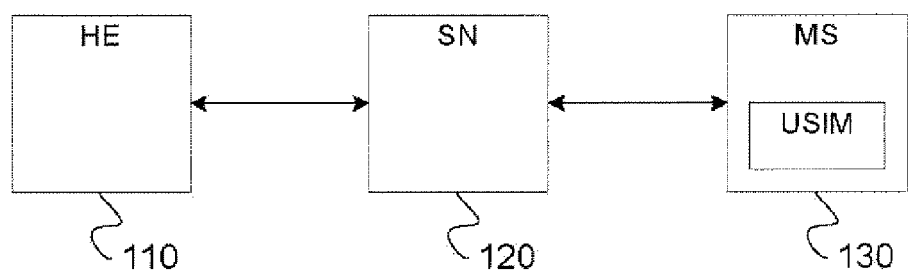
FIG. 1 is a block diagram of a communications network according to the prior art.
Figure 2:
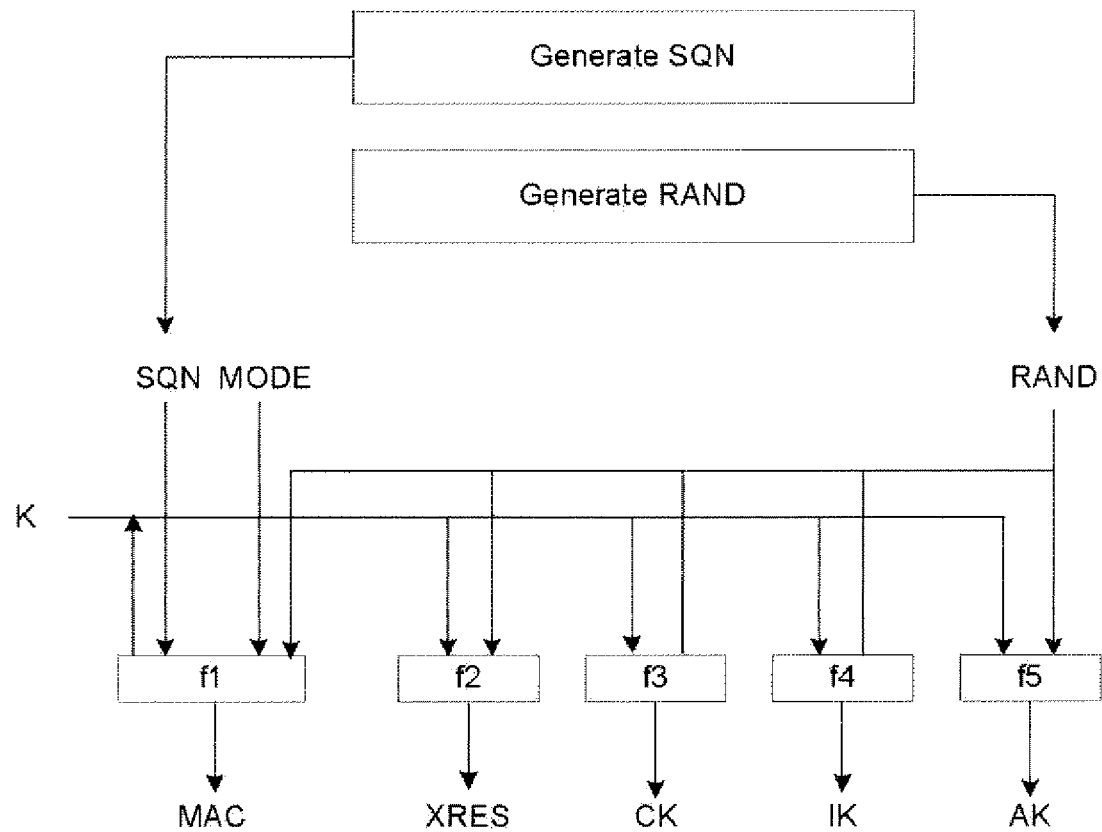
FIG. 2 illustrates generation of an authentication vector according to the prior art.
Figure 3:
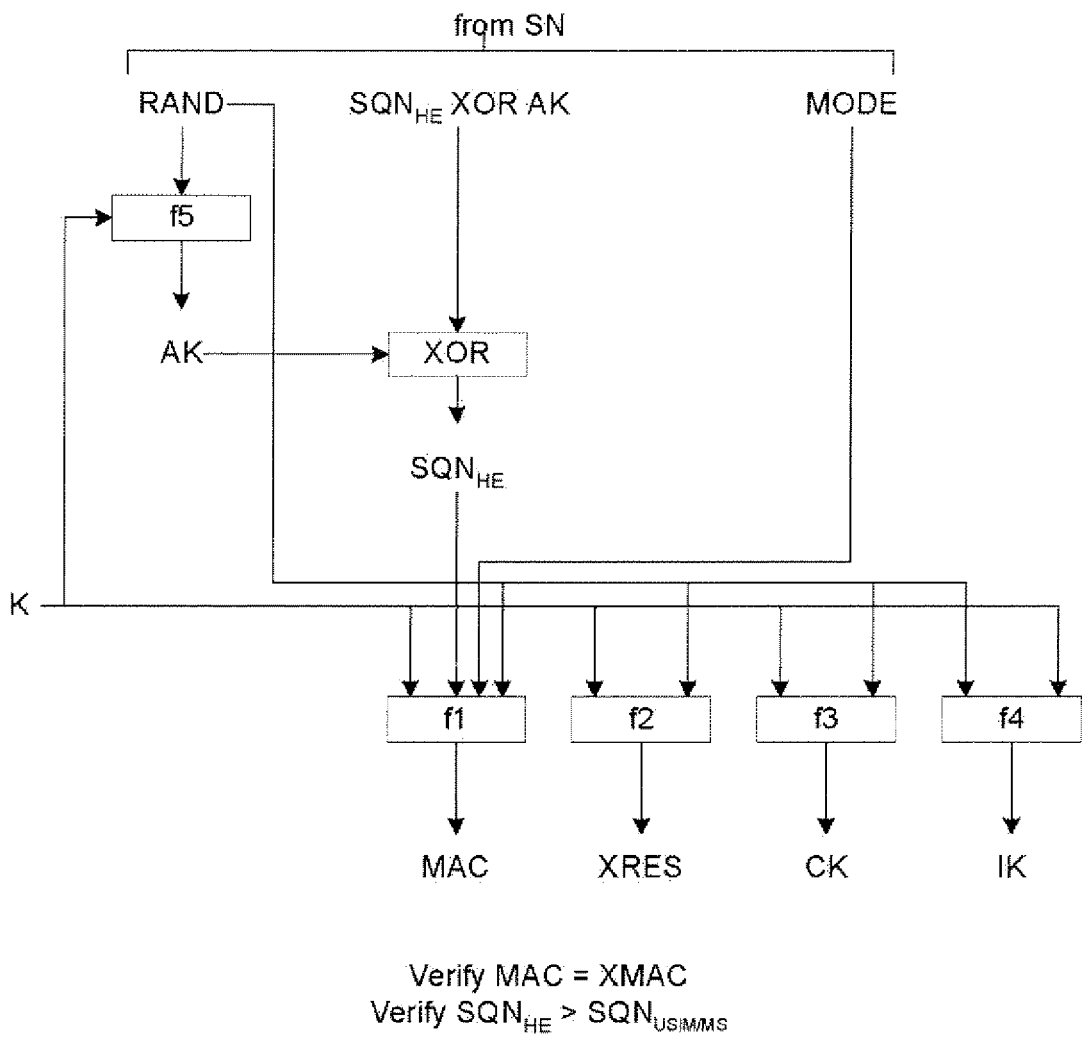
FIG. 3 illustrates authentication of a service network according to the prior art.
Figure 4:
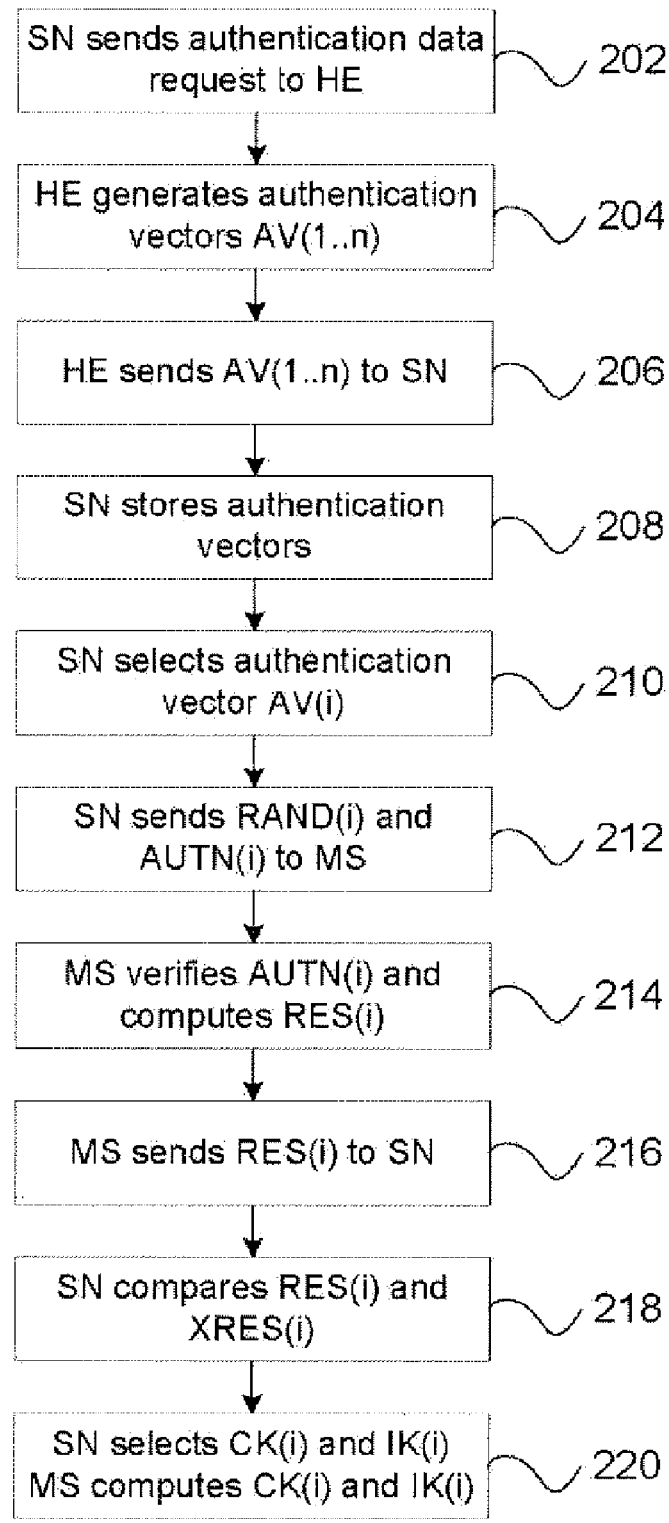
FIG. 4 is a flow-chart of an authentication and key agreement process according to the prior art.
Figure 5:
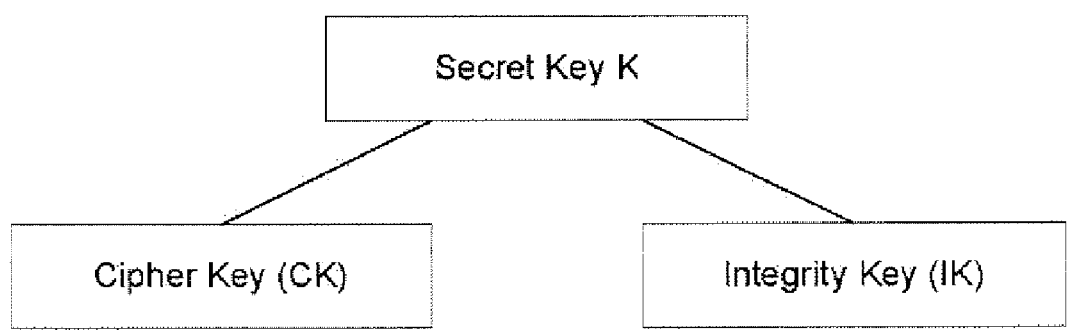
FIG. 5 illustrates a cryptographic key hierarchy according to the prior art.

After selecting (step 610) an AV(i), SN 120 sends (step 612) RAND(i) and AUTN(i) of AV(i) to MS 130. MS 130 verifies AUTN(i) and computes (step 614) RES(i) (see FIG. 3). If SQN(i) is greater than $SQN_{MS}$, MS 130 successfully authenticates SN 120. MS 130 sends (step 616) RES(i) to SN 120. SN 120 then compares (step 618) RES(i) with XRES(i). If RES and XRES are equal, SN 120 has successfully authenticated MS 130. Finally, MS 130 computes CK(i) and IK(i) while SN 120 selects (step 620) CK(i) and IK(i).

After establishing SSK and performing the initial AKA, the standard AKA protocol between SN 120 and MS/USIM 130 is modified by replacing $K_i$ with SSK for AKA calculations between the SN 120 and MS 130 for the duration of MS roaming. The protocol is further modified by using a Temporary SQN (TSQN) established between the SN 120 and MS/USIM 130 for the duration of MS 130 roaming in the SN 120 network area.

Figure 7:
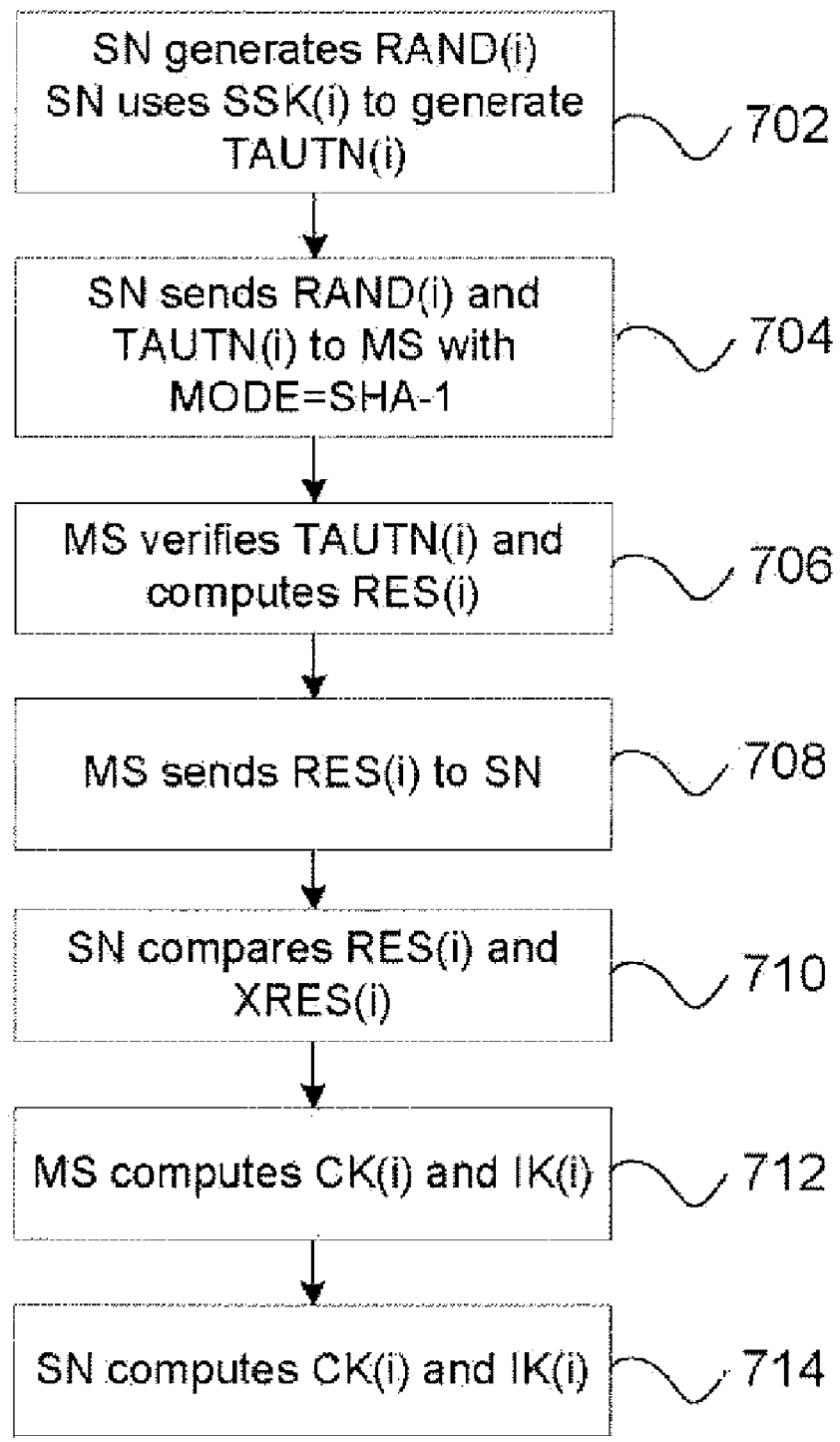
FIG. 7 is a flowchart of a mutual authentication mechanism using a shared secret K.
Figure 8:
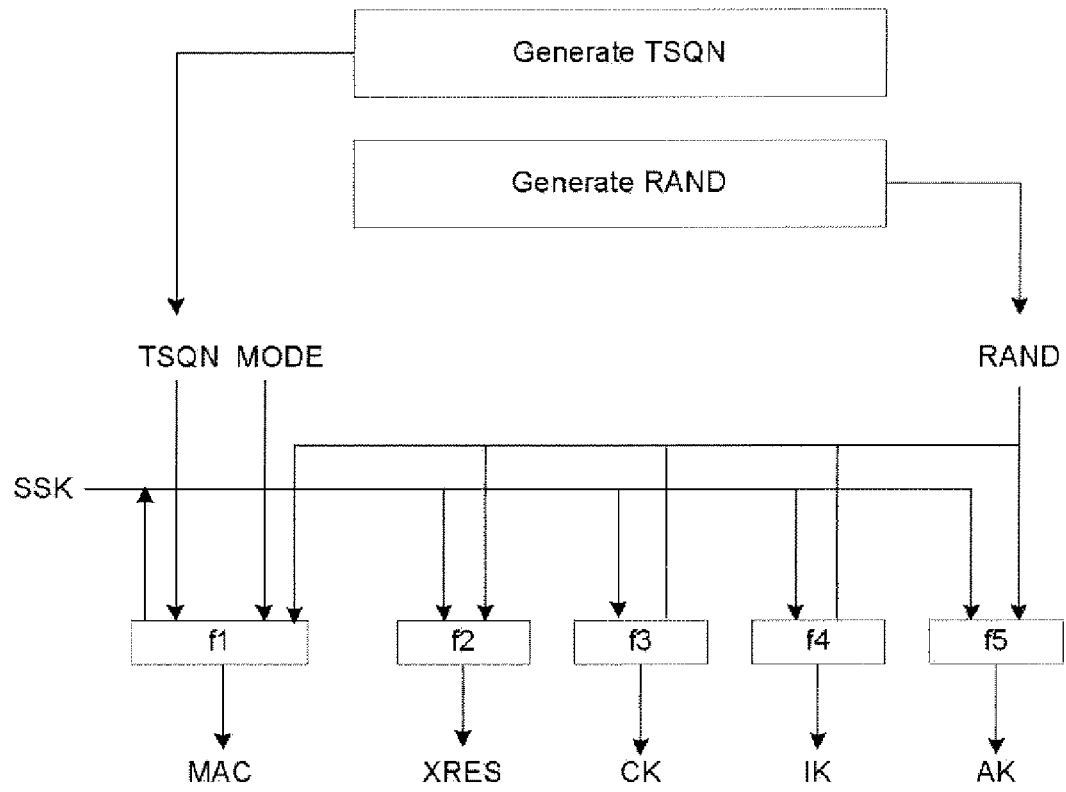
FIG. 8 illustrates generation of an authentication token.
Figure 9:
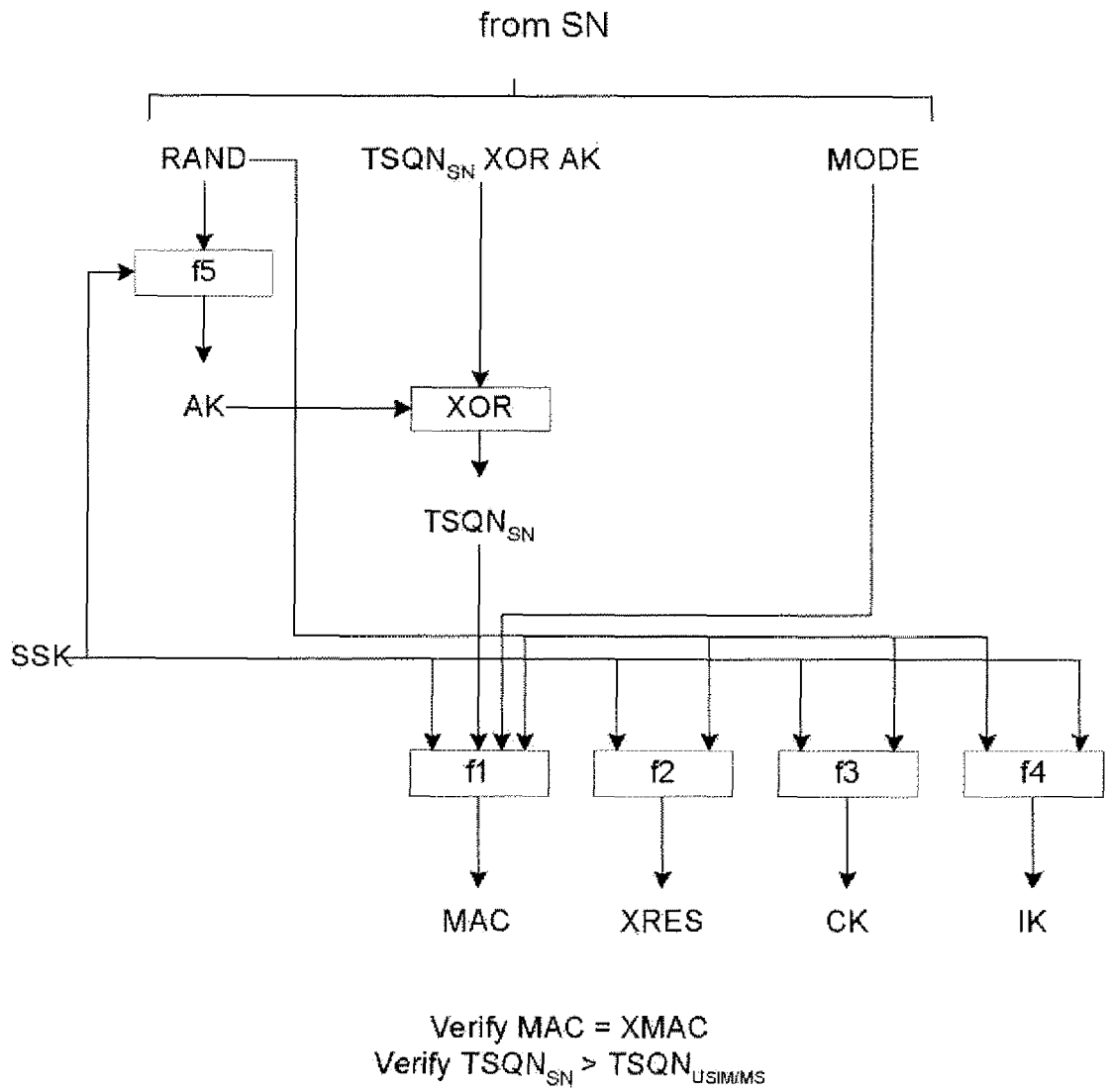
FIG. 9 illustrates authentication of a service network using a temporary sequence number.

FIG. 7 illustrates how subsequent authentications are performed between SN 120 and MS 130, for example, in response to a MS 130 request for service from SN 120. SN 120 generates (step 702) RAND(i) and generates TAUTN(i) using SSK(i) (see FIG. 8). SN 120 sends (step 704) RAND(i) and TAUTN(i) to MS 130, for example, with MODE=SHA-1. MS 130 verifies (step 706) TAUTN(i) and computes RES(i) (see FIG. 9). If $TSQN_{SN}(i)$ is greater than $TSQN_{MS/USIM}$, MS 130 successfully authenticates SN 120. MS 130 sends (step 708) RES(i) to SN 120. SN 120 compares (step 710) RES(i) with XRES(i). If RES and XRES are equal, SN 120 has successfully authenticated MS 130. MS 130 computes (step 712) CK(i) and IK(i) SN 120 computes (step 714) CK(i) and IK(i).

Just as $SQN_i$ uniquely increments for a $K_i$, $TSQN_i$ uniquely increments for an $SSK_i$. Thus for a unique SSK, the MS 130 maintains a uniquely incrementing TSQN to facilitate mutual authentication between the MS 130 and SN 120. While TSQN increments each time the same SSK is used for communication between an SN and MS, TSQN increments for a relatively short period of time compared with SQN, lessening the chance mis-synchronization. Additionally, TSQN need not impact the maintenance of SQN within the HE 110 and MS/USIM 130. TSQN can automatically reset when a new SSK (associated with a particular SN 120 is formed. This approach can eliminate the TR-45 problem of having to update SSD.

As described above, TSQN is a sequence number. However, other values indicating key usage may be featured. For example, adjusting the value may feature decrementing instead of incrementing a numeric value. Additionally, the value need not be restricted to numbers but may instead feature a character or boolean value.

A HE/SN pair, sharing a common primitive, can choose to utilize this scheme if they desire. However, even if HE 110 and SN 120 share a common AKA primitive, the HE 110 can utilize the standard 3GPP AKA mechanism and pass multiple AVs to SN 120.

The HE 110 may pass one or more AVs to SN 120 with the MODE value indicating standard 3GPP AKA. The SN 120, however, after the initial standard AKA setup, can use a common AKA primitive MODE value (e.g. SHA-1) to notify the MS 130 to use SSK and TSQN when utilizing the modified 3GPP AKA. Prior to initiating the optional AKA scheme, the SN 120 may determine if the MS 130 supports (e.g., includes instructions for) the optional scheme, for example, based on MS 130 identification information transmitted by the MS 120. Additionally, the MS 130 can transmit a message to the SN 120 declining use of the optional scheme, for example, if the MS 130 does not provide the primitive identified by the SN 120 in the MODE field.

Figure 10:
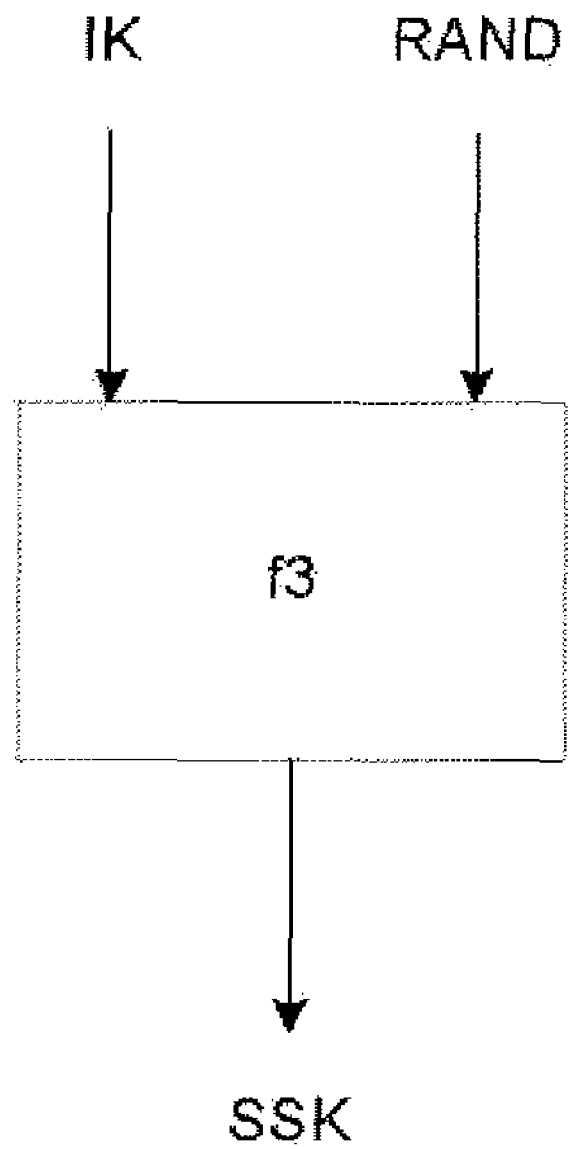
FIG. 10 illustrates generation of a shared secret.

FIG. 10 illustrates an example of SSK generation. As shown, SSK can be generated using IK and RAND where f3 is the generating function (e.g. $SSK=f3_{IK}(RAND)$). SSK may also be generated using a new function f6 derived from the shared cryptographic primitives(s) if desired.

Figure 11:
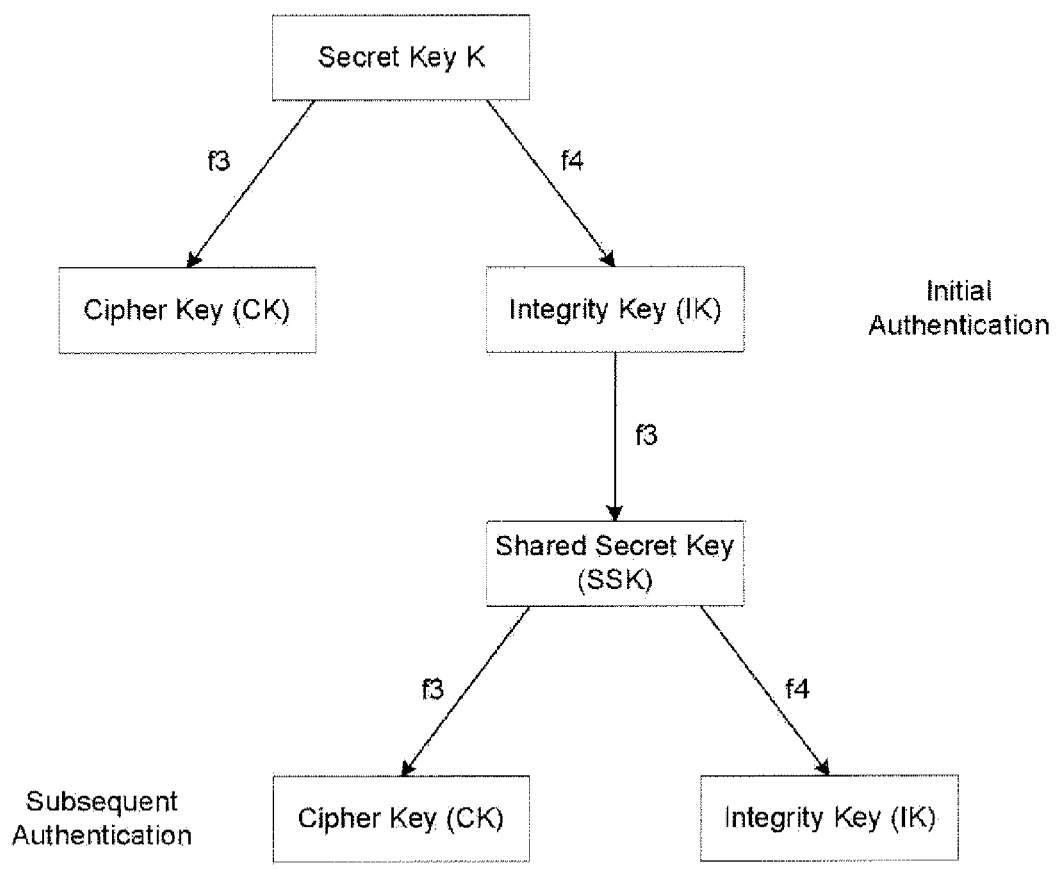
FIG. 11 illustrates a cryptographic key hierarchy.

FIG. 11 illustrates a cryptographic key hierarchy for the optional 3GPP AKA mechanism. A secret key K is the root secret shared between the HE 110 and MS 130. When mutual authentication is first performed between SN 120 and MS 130, a CK is generated to facilitate voice and data privacy and an IK is generated to facilitate message authentication. SSK can be derived from IK using function f3. For all subsequent SN 120 network accesses, CK and IK are derived from SSK.

Figure 12:
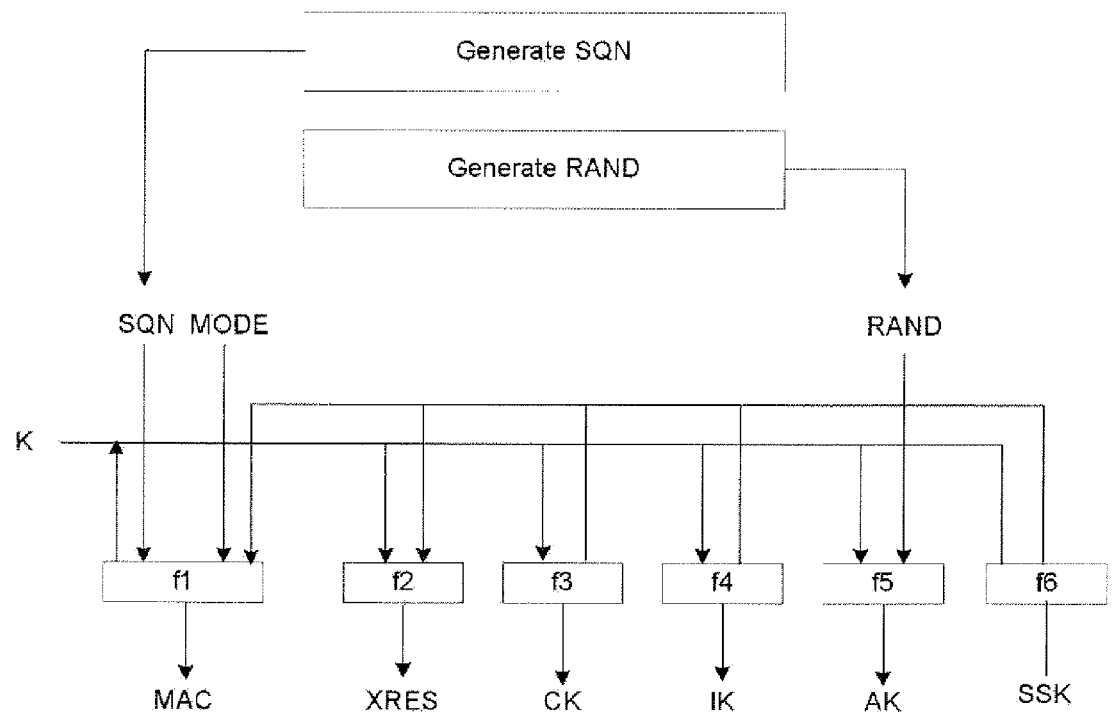
FIG. 12 illustrates generation of a shared secret authentication vector by a home environment.

FIG. 12 illustrates a different optional AKA mechanism. As shown, SSK may be generated using a new function f6 (e.g. $SSK=f6_K(RAND)$) When using the new function, SSK can be generated by HE 110. HE 110 can include the generated SSK in the AV. With SSK included in the AV, the AV is defined as Shared Secret AV (SSAV). A SN 120 receiving SSAV can simply extract SSK instead of independently computing SSK. The MS 130, however, still independently determines SSK from AV information transmitted by SN 120 to the MS 130.

After initial MS/SN mutual authentication and SSK generation, the SN 120 and MS/USIM 130 use SSK and TSQN for subsequent authentications as shown in FIG. 7. Resynchronization of TSQN is not necessary because SN 120 can query HE 110 for a new SSAV, perform standard 3GPP AKA and establish a new SSK with a TSQN reset. The SN 130 may request multiple AVs from the HE 110 initially to allow for new SSK formation and TSQN reset.

Figure 13:
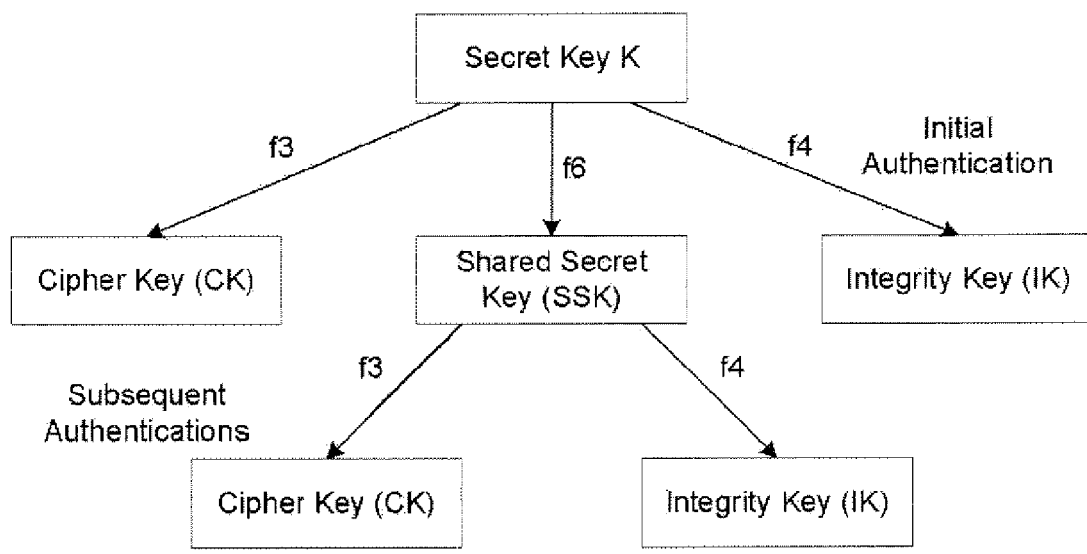
FIG. 13 illustrates a cryptographic key hierarchy.

FIG. 13 illustrates the cryptographic key hierarchy when SSK is formed by HE 110 using RAND and K. Although SSAV is larger than AV, HE 110 and SN 120 traffic is reduced in comparison to the original 3GPP AKA mechanism because only one SSAV is sent to SN 120 for roaming authentication. By generating SSK from RAND and K, instead of from RAND and IK, AKA mechanism security is improved. Thus, SSK can be derived from IK for improved efficiency or from K for improved security.

Figure 14:
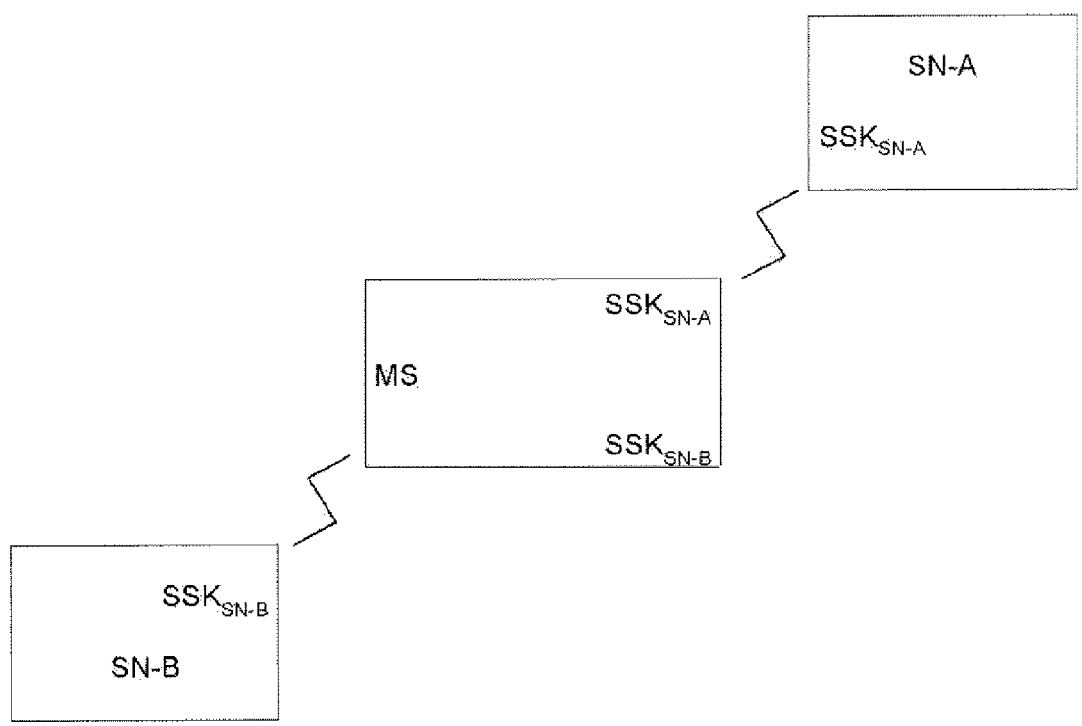
FIG. 14 illustrates a mobile station straddling bordering cells of different service networks.

FIG. 14 illustrates another aspect of the invention that provides support for border cell operations. As shown, the MS 130 can store different cryptographic elements (e.g., SSK/TSQN pairs) for different SNs 120. By storing multiple SSK/TSQN pairs with each pair associated with a different SN 120, the MS 130 can straddle the border between multiple systems without requiring VLR-to-VLR AV sharing, SSD sharing, or SSD update.

As shown in FIG. 14, MS 130 straddles between areas served by two different serving networks. MS 130 uses $SSK_{SN-A}$ for service from serving network A (SN-A) and $SSK_{SN-B}$ for service from serving network B (SN-B) The MS 130 may store identification of a SN and the respective SSK/TSQN pair being used. Thereafter, the 130 may identify the SN providing service to retrieve the appropriate pair.

SSK freshness depends on the SN 120 VLR and MS 130 rules. For example, the SN 120 may chose to store SSK for up to a week of inactivity. The MS 130 may store multiple SSK/TSQNs in a queue (five pairs or more) using first-in-first-out (FIFO). This technique may be ideal for travelers moving between multiple systems and countries within a brief period of time. In the event the MS 130 deletes $SSK_{SN-A}$ before SN-A deletes $SSK_{SN-A}$, the MS will recognize that SN-A is attempting the optional 3GPP AKA (e.g., MODE=SHA-1), issue a user authentication reject, and await standard 3GPP AKA to establish a new SSK with SN-A.

Figure 15:
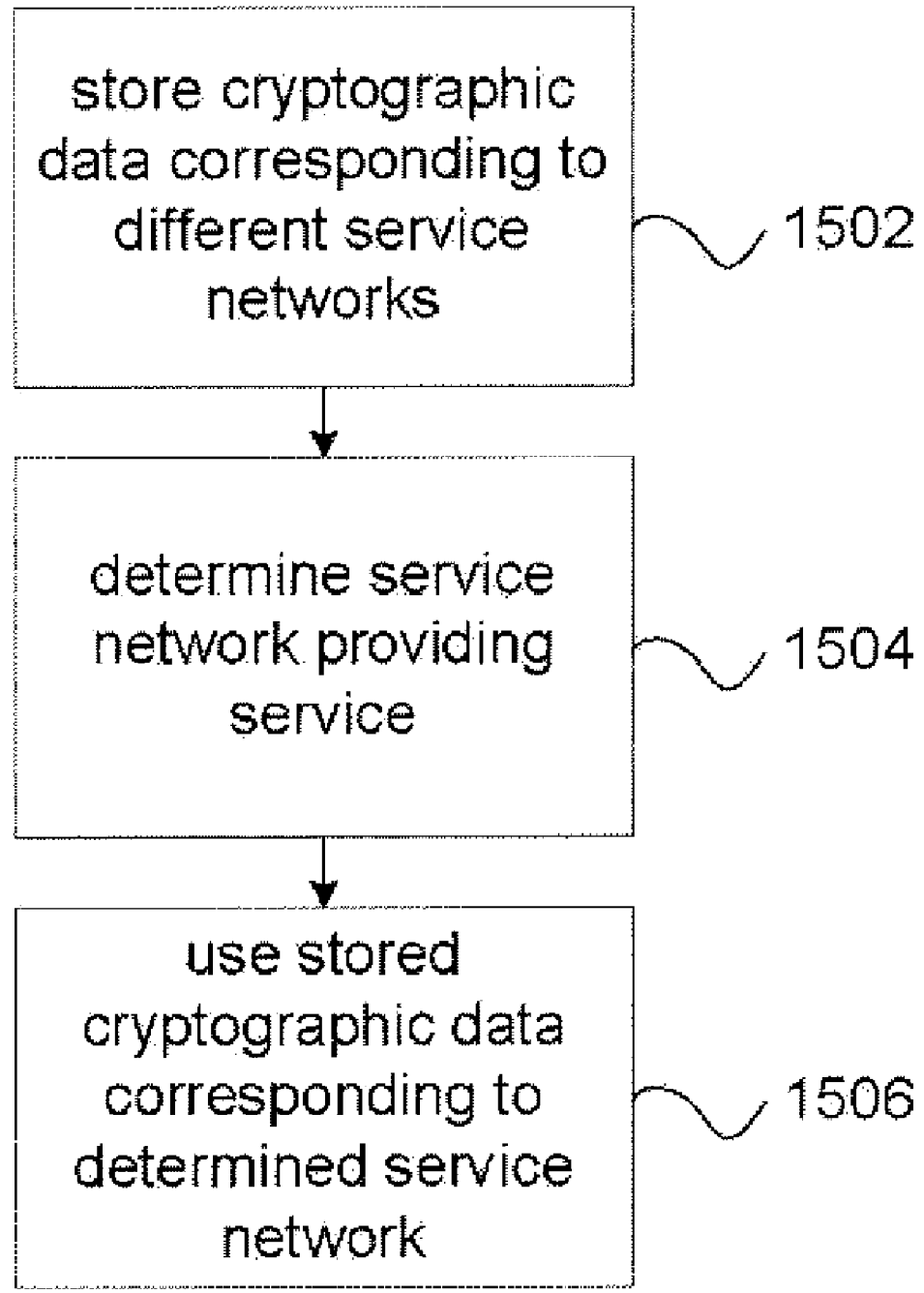
FIG. 15 is a flowchart of a mobile station process for handling communication with a service network.

FIG. 15 is a flowchart of a process for using cryptographic data associated with different cells. As shown, a MS stores (step 1502) cryptographic data, such as SSK/TSQN pairs, for different service networks. After determining (step 1504) a SN providing service, the MS can access and use the associated cryptographic data, for example, for authentication and encryption.

The techniques described above can, potentially, offer significant benefits for networks such as 3GPP and TR-45 (3GPP2) networks. For example, the techniques can allow for standard 3GPP AKA or modified 3GPP AKA at a service provider's discretion. The techniques can offer mutual authentication based on a publicly scrutinized cryptographic primitive. Potentially, techniques can reduce HE/SN AV traffic when a common AKA primitive is shared between HE and SN. The techniques can reduce the probability of SQN re-synchronization problem by using TSQN. The techniques can also reduce the need for SSD update in TR-45 networks, can reduce the vulnerability of fixed SSD by ensuring new SSK formation between MS and SN, can reduce cryptographic export/import concerns for the United States and other countries interested in adopting TR-45 standards, and can reduce the need for VLR-to-VLR AV sharing, SSD sharing, and SSD update for border cell operations.

Other embodiments are within the scope of the following claims. Additionally, though many of the method claims feature a series of elements, the order these elements occur may vary from their order in the claim.

What is claimed is:

1. A method comprising:
storing a shared secret authentication vector and a shared secret key at a service network, the shared secret key being extracted by the service network and shared between the service network and a station;
determining an existence of a shared cryptographic primitive between the service network and the station;
negotiating an authentication and key agreement method based upon the existence of the shared cryptographic primitive;
transmitting information to the station from the service network that enables the station to compute the shared secret key stored at the service network;
receiving a request for service at the service network from the station;
adjusting, at the service network, a verification value at each usage of the shared secret key at the station in response to receipt of the request for service from the station to facilitate mutual authentication between the service network and the station; and
transmitting, from the service network to the station, information corresponding to the verification value that forms a part of a verification computation enabling the station to authenticate the service network.

2. A method comprising:
storing a shared secret authentication vector and a shared secret key at a service network, the shared secret key being extracted by the service network and shared between the service network and a station;
determining an existence of a shared cryptographic primitive between the service network and the station;
negotiating an authentication and key agreement method based upon the existence of the shared cryptographic primitive;
transmitting information to the station from the service network that enables the station to compute the shared secret key stored at the service network;
maintaining, at the service network, an indicator of shared secret key usage at the station by adjusting a verification value at each usage of the shared secret key to facilitate mutual authentication between the service network and the station;
transmitting, from the service network to the station, an indicator of shared secret key usage maintained by the service network; and
comparing the shared secret key usage indicator maintained by the service network with the shared secret key usage indicator maintained by the station, and transmitting from the service network to the station information corresponding to the verification value that forms a part of a verification computation, thereby enabling the station to authenticate the service network.

3. A method comprising:
storing a shared secret authentication vector and a shared secret key at a service network, the shared secret key being extracted by the service network and shared between the service network and a station;
transmitting information to the station from the service network that enables the station to compute the shared secret key stored at the service network;
receiving a request for service at the service network from the station;
adjusting, at the service network, a verification value at each usage of the shared secret key at the station in response to receipt of the request for service from the station to facilitate mutual authentication between the service network and the station;
transmitting, from the service network to the station, information corresponding to the verification value that forms a part of a verification computation enabling the station to authenticate the service network;
determining at a home environment network an existence of a cryptographic primitive offered to the home environment by the service network;
negotiating an authentication and key agreement method based upon the existence of the cryptographic primitive; and based on the determined cryptographic primitive, transmitting to the service network at least one vector of authentication information corresponding to a particular station.

4. A method comprising:

storing a plurality of different sets of cryptographic information for a plurality of different service networks;

determining an existence of a shared cryptographic primitive between one of the plurality of different service networks and a station;

negotiating an authentication and key agreement method based upon the existence of the shared cryptographic primitive;

selecting one of the plurality of sets of cryptographic information for one of the plurality of service networks; and using the one selected set of cryptographic information to communicate with the one of the plurality of service networks to authenticate the one of the service networks to a mobile station by:

storing a shared secret authentication vector and a shared secret key at the one of the service networks, the shared secret key being extracted by the one of the service networks and shared between the one of the service networks and the mobile station;

transmitting information to the mobile station from the one of the service networks that enables the mobile station to compute the shared secret key stored at the one of the service networks;

receiving a request for service at the one of the service networks from the mobile station;

adjusting, at the one of the service networks, a verification value at each usage of the shared secret key at the mobile station in response to receipt of the request for service from the mobile station to facilitate mutual authentication between the service networks and the mobile station; and transmitting, from the one of the service networks to the mobile station, information corresponding to the verification value that forms a part of a verification computation enabling the mobile station to authenticate the one of the service networks.

5. A method comprising:

storing one authentication vector in a service network which generates a shared secret key stored at the service network;

determining an existence of a shared cryptographic primitive between the service network and a station;

negotiating an authentication and key agreement method based upon the existence of the shared cryptographic primitive;

transmitting information to the station from the service network that enables the station to compute the shared secret key stored at the service network;

negotiating use of a cryptographic primitive between the service network and the station;

receiving a request for service at the service network from the station;

adjusting, at the service network, a verification value at each usage of the shared secret key at the station in response to receipt of the request for service from the station to facilitate mutual authentication between the service network and the station; and transmitting, from the service network to the station, information corresponding to the verification value that forms a part of a verification computation enabling the station to authenticate the service network.

* * * * *